June 30, 1970  S. D. FARMER  3,517,889
FLOUR MILLING METHOD AND APPARATUS
Filed Jan. 30, 1967  2 Sheets-Sheet 1
Fig. 1
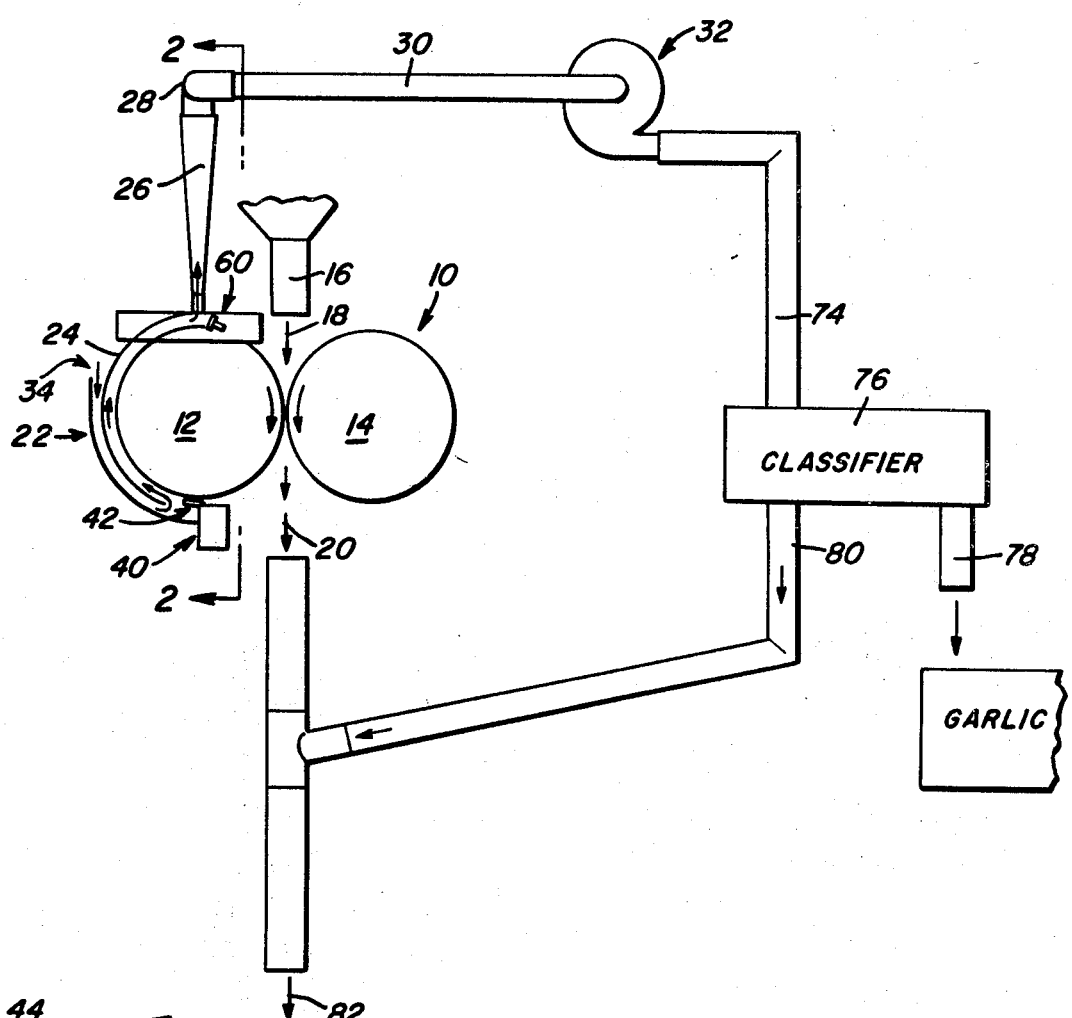
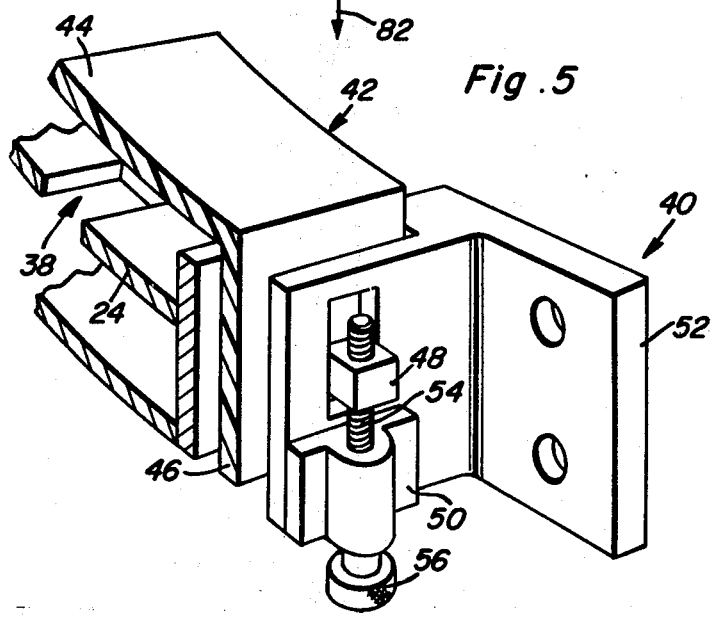
Fig. 5
Samuel D. Farmer
INVENTOR.
BY *Clarence A. O'Brien*
*and Harvey B. Jacobson*
Attorneys June 30, 1970  S. D. FARMER  3,517,889
FLOUR MILLING METHOD AND APPARATUS
Filed Jan. 30, 1967  2 Sheets-Sheet 2
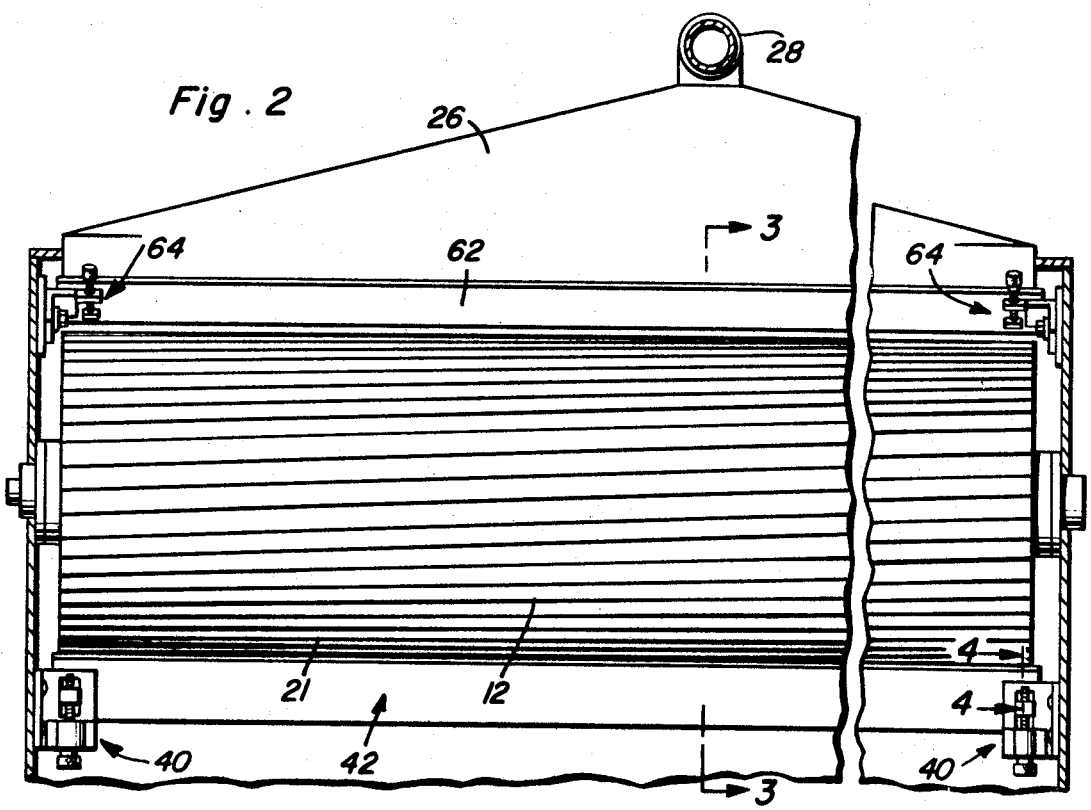
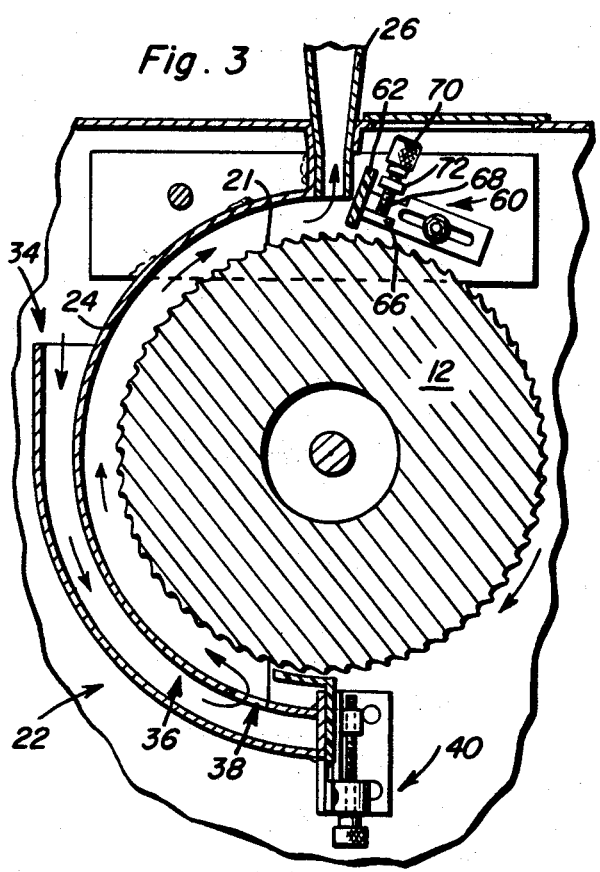
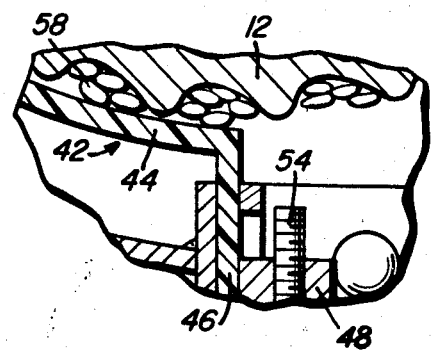
Samuel D. Farmer
INVENTOR.
BY
*Clarence A. O'Brien*
*and Harvey B. Jackson*
Attorneys

United States Patent Office 3,517,889
Patented June 30, 1970

3,517,889
FLOUR MILLING METHOD AND APPARATUS
Samuel D. Farmer, 341 The Riviera,
Mount Vernon, Ind. 47620
Filed Jan. 30, 1967, Ser. No. 612,424
Int. Cl. B02b *3/04;* B07b *13/00*
U.S. Cl. 241—9                                              6 Claims

ABSTRACT OF THE DISCLOSURE

An apparatus and a method for doffing weed seed from a surface of one of a pair of cooperative crushing rollers acting upon weed seed-containing cereal grain being milled. The cereal grain is fed to the nip of a pair of fluted crushing rolls where it is crushed. The weed seeds contained in the cereal become tacky and adhere to at least one of the rolls. An adjustable suction manifold extends about the periphery of the roll at a point spaced from the roll nip and acts to draw off the adhered weed seeds and feed them to a scalper classifier where the seed is separated from any roll runaround admixed therewith. The roll runaround is then permitted to return to the flow of the milled cereal.

---

The present invention relates to an apparatus for separating undesirable seeds from cereal grains during the milling thereof. More particularly, the present invention relates to an apparatus for separating garlic weed seeds and the like from cereal grains being milled. Specifically, the present invention contemplates a pneumatically operated means for doffing garlic weed seeds which adhere to the surface of a fluted crushing roller comprising a portion of a crushing means utilized to initially crush the cereal grain being milled.

Numerous apparatuses have been proposed heretofore for utilization in grain milling systems, and particularly those utilized for the milling of soft wheat flour grown and harvested during seasons of the year when conditions also favor the growth of various noxious weeds such as garlic weed, for example, so as to effectively separate such undesirable seeds from the grain being milled at an early stage in the milling process. While such apparatuses are somewhat suitable for the removal of a portion of the garlic seed, such as when the grain goes through a pair of opposed rotating special cut Getschell rollers in order to break or decorticate the grain. However, such prior attempts at constructing suitable devices for the removal of garlic weed seed and the like have been somewhat less than satisfactory in that they do not substantially eliminate garlic weed seeds and the like present in the grain.

It is therefore a primary object of the present invention to provide a novel apparatus for simply and efficiently separating garlic weed seeds and the like from cereal grains being milled.

Another object of the present invention is to provide a novel apparatus for pneumatically doffing garlic weed seeds and the like from the surface of a second break milling roll comprising one of a pair of opposed counter-rotating grain crushing rollers utilized to convert the wheat grain to bran, broken middlings and the like.

Still another object of the present invention is to provide a pneumatic doffing means for a flour milling apparatus wherein tacky, decorticated garlic seeds adhering to the grain crushing roller are pneumatically removed from the surface of the crushing roller along with a minute amount of bran, broken middlings, and the like, also adhering thereto which material removed from the face of the crushing roller may then be subjected to a scalping operation wherein the garlic is separated from the other components such as by the utilization of a vibrating screen classifier prior to returning the bran, broken middlings and the like to the main flow of grain being milled.

Still another object of the present invention is to provide a pneumatically operated means for doffing garlic weed seeds and the like from the surface of a second break roller in a milling system wherein the pneumatically operated doffing means includes a vacuum manifold operatively positioned in an arcuate manner about a significant portion of one of the first break rollers so as to effectively remove tacky decorticated garlic weed seeds and the like adhering to the face of the roller.

Still another object of the present invention is to provide a novel apparatus for removing garlic weed seeds and the like from grains which apparatus includes a pneumatically operated doffing means connected to a suitable source of vacuum which doffing means includes an accurately adjustable vacuum intensity varying means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a schematic diagram of an exemplary embodiment of an apparatus for pneumatically separating weed seeds and the like from cereal grains which apparatus is constructed in accordance with the principles of the present invention;

FIG. 2 is a side elevational view of a significant portion of the apparatus of the present invention taken generally along the plane of the line 2—2 of FIG. 1;

FIG. 3 is a transverse vertical sectional view taken substantially along the plane of line 3—3 of FIG. 2;

FIG. 4 is an enlarged fragmentary vertical cross-sectional view showing the cooperation between the roller and an entry gate means; and FIG. 5 is an enlarged fragmentary perspective of an exemplary means of adjusting the gate member relative to the periphery of the roller.

Referring now to the drawings and FIG. 1 in particular it will be seen that the exemplary embodiment of a flour milling apparatus 10 schematically illustrated therein and constructed in accordance with the principles of the present invention includes a pair of counter-rotating cut rolls 12 and 14 preferably although not necessarily power driven at differential speeds such as 650 r.p.m. and 260 r.p.m., for example, so as to cut or break the weed seed contaminated grain flowing downwardly therebetween from an uncut grain feed means 16 as represented by the flow arrow 18.

As seen best in FIGS. 2-4 the cut rolls 12 and 14 of a conventional transversely fluted type normally utilized in flour milling apparatuses and in the present case are preferably of the Getschell roller type which are transversely fluted at a slight angle to the longitudinal axes of the rolls 12 and 14 so as to rub, cut and thus decorticate grain, weed seeds and the like flowing into the nip therebetween for reasons which will become apparent during discussion of the operation of the apparatus of the present invention.

As also seen in FIG. 1 and represented by the flow arrow 20 the majority of the grain flowing into the nip of the rolls 12 and 14 passes downwardly therefrom in the form of bran, broken middlings, and the like, preparatory to being further reduced in size and purified to convert the grain into flour. As indicated heretofore, however, the grain being placed into the nip of the rolls 12 and 14, particularly in the case of soft wheat harvested during the late spring and early summer, contains deleterious amounts of weed seeds and the like and particularly the seeds of wild garlic plant which if permitted to remain in the flour render the finished product somewhat undesirable.

Thus, the present invention contemplates providing at least one of the Getschell rolls, and as illustrated herein roll 12, with a garlic seed doffing means indicated generally at 22 which, as best seen in FIG. 3, comprises an arcuate pneumatic manifold member 24 extending preferably althrough not necessarily approximately 180 degrees about the periphery of the roll 12 starting at a point spaced approximately 90 degrees from the nip of the rolls 12 and 14. As will be understood from FIG. 2 the manifold member 24 extends substantially the entire length of the roll 12. The manifold 24 is connected by a suitable suction header 26 and conduits 28 and 30 to a suitable source of vacuum, i.e. a pressure less than the ambient pressure provided, for example, by being connected to the intake of a centrifugal fan, pump or the like 32. Thus, it will be appreciated from the doffing air flow arrows within the manifold 24 in FIGS. 1 and 3 that air drawn into the manifold 24 at the inlet indicated generally at 34 passes downwardly along the arcuate chamber indicated at 36 and thence upwardly through the aperture 38 into contact with the periphery of the roll 12 in in-flow or concurrent relation thereto, i.e. flowing in the same direction as rotation of the roll 12. The air which enters at 34 is then exhausted from the header 26 by the suction device 32 and in doing so, the decorticated garlic seeds and the like which adhere to the Getschell roll 12 are doffed from the roll. The garlic seeds become tacky once their outer hull has been cut by the corrugations on the rolls. The flow of air over the periphery of the roll in addition to removing the garlic weed seeds and the like adhering thereto also picks up a small amount of roll runaround i.e. bran, broken middlings and the like which inadvertently adhere to the roll 12.

Further, it will be seen from a consideration of FIGS. 3, 4 and 5 the pneumatic weed seed doffing means 22 is provided with an accurately adjustable inlet lip means 40 to limit the amount of roll runaround which includes an inlet lip 42 of a generally inverted L-shaped configuration having an arcuate portion 44 which generally conforms to the radius of the Getschell roll 12 and a depending portion 46 having an integral internally threaded block 48 adapted to be threadably received upon an adjusting micrometer. The micrometer includes a threaded block 50 carried by a bracket 52 fixed such as by bolts to the frame of the pneumatic doffing means 22 and provided with a threaded adjusting bolt 54 having a knurled head 56. The bolt 54 may be rotated to effect reciprocation of the lock 48 and thus the adjustable lip 42 so as to accurately adjust the clearance between the lip 42 and the periphery of the roll 12 as may be required to limit the amount of roll runaround which passes up into the vacuum area defined by the manifold 24 without adversely effecting the ability of the pneumatic doffing means 22 to remove tacky garlic weed seeds and the like such as indicated at 58 in FIG. 4, from the Getschell roll 12. As seen best in FIG. 2 the adjustable inlet lip 42 is preferably provided with at least two of the micrometer adjusting means 40.

As will be appreciated from FIGS. 1, 2 and 3, the pneumatic doffing means 22 is further provided with an accurately adjustable outlet lip means indicated generally at 60 adapted to selectively vary the opening between the periphery of the Getschell roll 12 and the vacuum header 26 so as to permit selectively varying the vacuum effect of the suction device 32. The adjustable outlet lip 60 includes a transverse bar 62 which as seen in FIG. 2 extends substantially along the entire length of the Getschell roll 12. As in the case of the inlet lip 42 the outlet lip 60 is also preferably provided with at least two micrometer adjusting means indicated at 64 and comprising in a manner similar to the micrometer adjusting means 40 a threaded member 66 integral with the bar 62 and threadably received about a threaded bolt or adjusting member 68 provided with a knurled head 70 rotatably carried by an internally threaded block 72 fixed to the body of the pneumatic doffing means 22 so as to permit rotation of the threaded bolt 68 to effect reciprocation of the outlet lip 62.

It will be appreciated that decorticated garlic weed seeds and a minute amount of runaround doffed from the roll 12 by the pneumatic doffing means 22 will be discharged from the vacuum fan 32 through a conduit 74 into a scalping classifier 76, such as of a conventional type utilizing a rapidly reciprocating apertured plate or screen, so as to classify the material discharging from the device 32 into two separate flows one comprising the garlic weed seed and the like discharging such as at 78 where it is collected prior to being disposed of and the remaining flow of mill runaround comprised of bran, broken middlings and the like through the conduit 80 where it rejoins the main product flow 20 to be passed on as combined flow 82 which is conveyed to a conventional subsequent milling step.

From the foregoing it will be appreciated that there has been provided a relatively simple, highly efficient means of removing substantially all the garlic weed seeds and the like present in wheat or other cereal grains being milled so as to enhance the quality of the flour produced therefrom.

The foregoing is considered as illustrative only the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a grain milling system an apparatus for separating garlic weed seeds and the like from grain being milled which comprises a pair of cooperating counter-rotatable transversely fluted rigid rolls adapted to receive and catch therebetween a flow of weed seed and the like containing grain to be decorticated whereby the decorticated weed seeds by virtue of their tackiness cling to at least one of said transversely fluted rolls and pneumatic weed seed doffing means operatively associated with said one transversely fluted roll for removing the weed seeds clinging thereto thereby removing the weed seeds from the flow of grain being acted upon by said cooperating rolls, said pneumatic doffing means including a means of passing a flow of air over the surface of said one fluted roll in concurrent flow relative to the rotation of the roll.

2. The combination of claim 1 wherein said transversely extending flutes on said rolls are in an inclination to the longitudinal axis of said rolls.

3. In combination with a grain milling system an apparatus for separating garlic weed seeds and the like from grain being milled which comprises a pair of cooperating counter-rotatable transversely fluted rigid rolls adapted to receive and catch therebetween a flow of weed seed and the like containing grain to be decorticated whereby the decorticated weed seeds by virtue of their tackiness cling to at least one of said transversely fluted rolls and pneumatic weed seed doffing means operatively associated with said one transversely fluted roll for removing the weed seeds clinging thereto thereby removing the weed seeds from the flow of grain being acted upon by said cooperating rolls, said pneumatic doffing means comprising a pneumatic manifold extending about a significant proportion of the periphery of at least one of said rolls at a point spaced from the nip existing between said cooperating rolls and said pneumatic doffing means also includes adjustable inlet and outlet lip means adapted to selectively vary the clearance between said manifold and the periphery of said transversely fluted rolls.

4. The combination of claim 3 wherein said pneumatic doffing means includes a vacuum producing means operatively connected to said manifold so as to doff weed seeds and the like clinging to the roll, and a scalping means interposed in the discharge flow of said vacuum means to separate the garlic weed seeds from any roll runaround admixed therewith so as to permit return of the roll runaround to the flow of grain being milled.

5. The method of freeing cereal grain and the like being milled of garlic weed seeds and the like which comprises subjecting the flour being milled to a pair of cooperating counter-rotating transversely fluted rigid rolls to decorticate the weed seed, and grain in a nip region therebetween to render the weed seed tacky and cause the weed seed to cling to at least one of the rolls, and subjecting the surface of said at least one of said rolls to the action of a confined flow of air over a significant portion thereof starting from a point spaced down-roll of the nip region between the rolls and terminating ahead of the nip to doff the weed seed, whereby the grain being milled is freed of weed seed, said flow of air over the surface of the roll passing over the roll in a direction concurrent with the rotation of the roll.

6. The method of claim 5 including the steps of scalping the weed seed from the mill runaround and returning the mill runaround to the cereal grain which has been acted upon by the cooperating rolls.

References Cited

UNITED STATES PATENTS

| | | | |
|---|---|---|---|
| 22,359 | 12/1858 | Fritz | 209—46 |
| 672,833 | 4/1901 | Scheirer | 241—79.1 X |
| 701,223 | 5/1902 | Rice | 209—46 |
| 2,686,011 | 8/1954 | Oishi | 241—79.1 |
| 3,288,283 | 11/1966 | Clary | 209—45 |

FOREIGN PATENTS

| | | |
|---|---|---|
| 412,755 | 7/1910 | France. |
| 708,548 | 7/1941 | Germany. |

LESTER M. SWINGLE, Primary Examiner

D. G. KELLY, Assistant Examiner

U.S. Cl. X.R.

209—45; 241—60, 79.1